United States Patent
Lee et al.

(10) Patent No.: US 12,452,138 B2
(45) Date of Patent: Oct. 21, 2025

(54) APPARATUS AND METHOD FOR PROVIDING ANALYTICS TO USER EQUIPMENT

(71) Applicant: ELECTRONICS AND TELECOMMUNICATIONS RESEARCH INSTITUTE, Daejeon (KR)

(72) Inventors: Soohwan Lee, Daejeon (KR); Myung Ki Shin, Daejeon (KR); Jihoon Sung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 16 days.

(21) Appl. No.: 18/080,011

(22) Filed: Dec. 13, 2022

(65) Prior Publication Data

US 2023/0198853 A1 Jun. 22, 2023

(30) Foreign Application Priority Data

| Dec. 17, 2021 | (KR) | 10-2021-0181407 |
| Mar. 29, 2022 | (KR) | 10-2022-0039201 |
| May 6, 2022 | (KR) | 10-2022-0056248 |
| May 11, 2022 | (KR) | 10-2022-0057673 |
| May 20, 2022 | (KR) | 10-2022-0062150 |
| Dec. 13, 2022 | (KR) | 10-2022-0174079 |

(51) Int. Cl.
*H04L 41/14* (2022.01)

(52) U.S. Cl.
CPC .................................... *H04L 41/14* (2013.01)

(58) Field of Classification Search
CPC ...................................................... H04L 41/14
See application file for complete search history.

(56) References Cited

U.S. PATENT DOCUMENTS

| 8,181,195 | B2 | 5/2012 | Sardera |
| 11,310,731 | B1 * | 4/2022 | Feder .................... H04W 36/32 |
| 2021/0105656 | A1 * | 4/2021 | Estevez ............... H04L 41/5067 |
| 2021/0306231 | A1 | 9/2021 | Lee et al. |
| 2022/0108214 | A1 | 4/2022 | Lee et al. |

OTHER PUBLICATIONS

ETRI, "KI#2: New solution for UP-based 5GC information exposure to UE", SA WG2 Meeting #150E e-meeting, S2-2202445, Apr. 6-12, 2022, Elbonia.
ETRI, "KI#2, Sol#2: Update to reduce signalling overheads", S2-2204199, May 16-20, 2022, Elbonia.

* cited by examiner

*Primary Examiner* — Gil H. Lee
(74) *Attorney, Agent, or Firm* — LRK PATENT LAW FIRM

(57) ABSTRACT

A method and apparatus for providing analytics to UE through steps of receiving a UE ID of UE and an analytics ID requested by the UE and transmitting analytics corresponding to the analytics ID to the UE are provided.

12 Claims, 8 Drawing Sheets

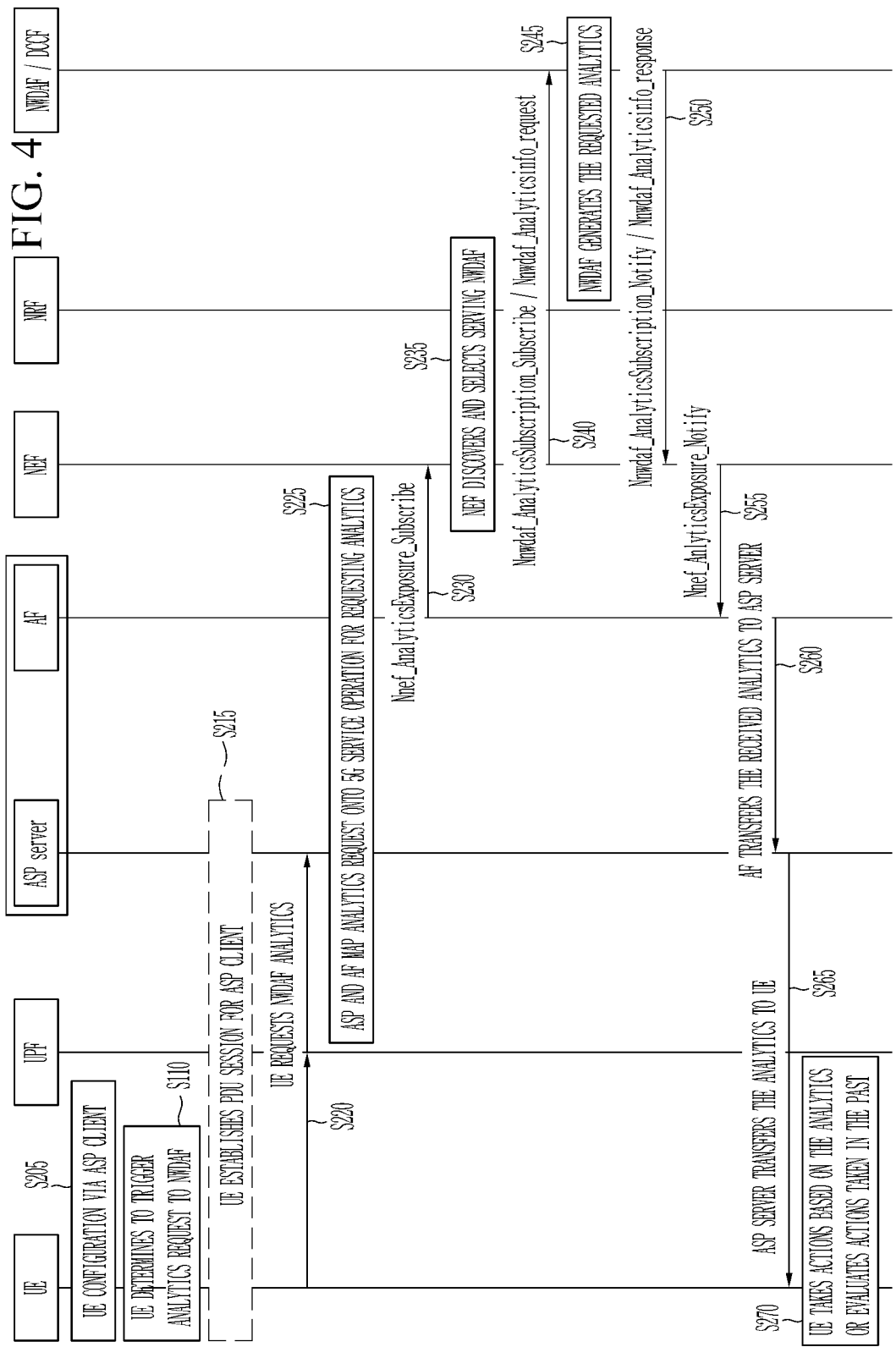

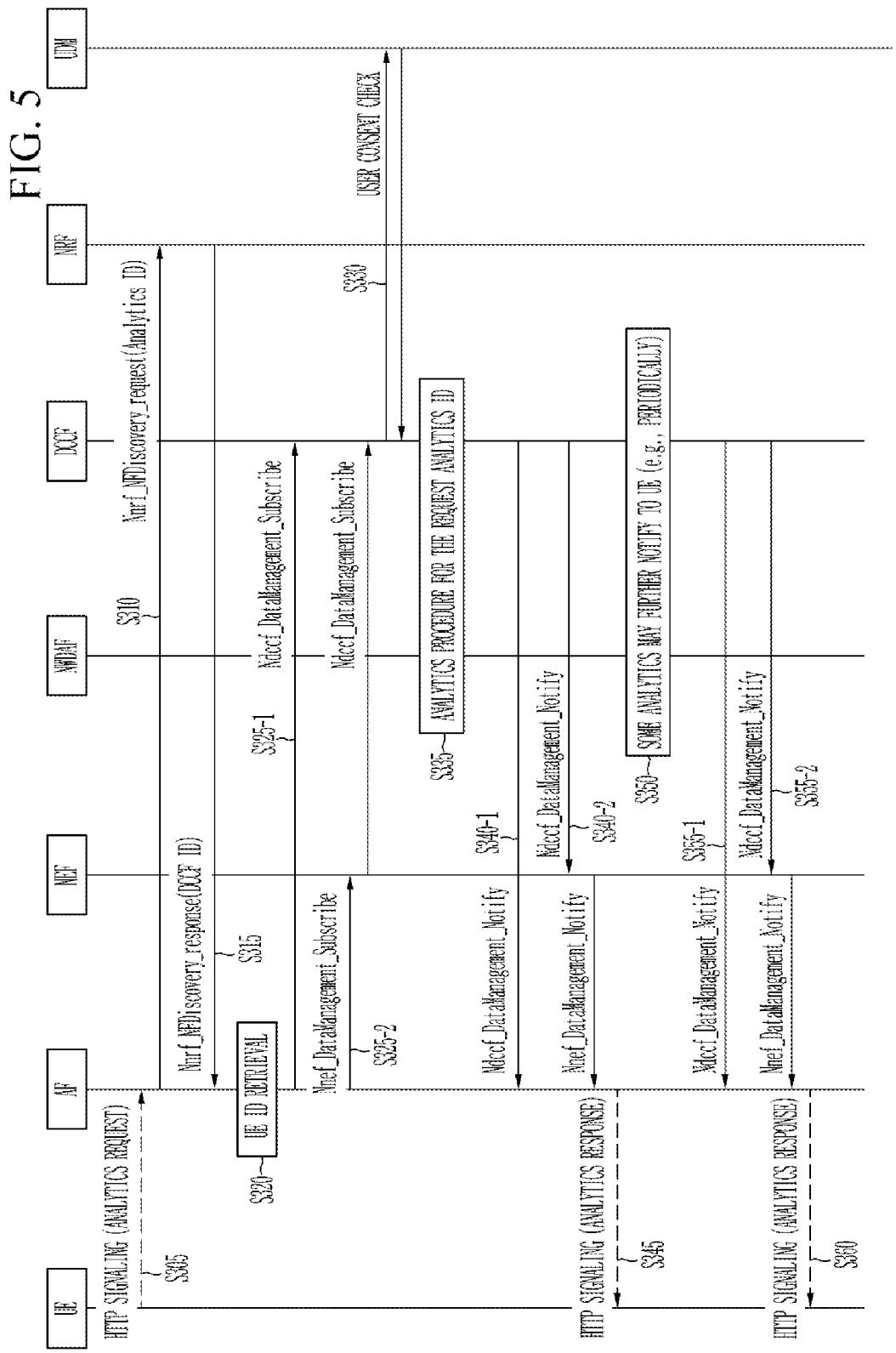

APPARATUS AND METHOD FOR PROVIDING ANALYTICS TO USER EQUIPMENT

CROSS-REFERENCE TO RELATED APPLICATIONS

This application claims priority to and the benefit of Korean Patent Application No. 10-2021-0181407 filed in the Korean Intellectual Property Office on Dec. 17, 2021, Korean Patent Application No. 10-2022-0039201 filed in the Korean Intellectual Property Office on Mar. 29, 2022, Korean Patent Application No. 10-2022-0056248 filed in the Korean Intellectual Property Office on May 6, 2022, Korean Patent Application No. 10-2022-0057673 filed in the Korean Intellectual Property Office on May 11, 2022, Korean Patent Application No. 10-2022-0062150 filed in the Korean Intellectual Property Office on May 20, 2022, and Korean Patent Application No. 10-2022-0174079 filed in the Korean Intellectual Property Office on Dec. 13, 2022, the entire contents of which are incorporated herein by reference.

BACKGROUND

1. Technical Field

The present disclosure relates to a method and apparatus for providing analytics to UE.

2. Description of Related Art

The NWDAF can implement automation and optimization of the 5G mobile communication system by collecting data distributed within the 5G network and providing analytics that measures and predicts status information of the entire mobile communication network based on the collected data.

Each entities of the 5G system can make intelligent and automated decision-making in consideration of the entire state of the mobile communication network based on the analytics provided by the NWDAF and through this, optimization of the mobile communication network can be achieved.

However, currently, the analytics provided by the NWDAF can be used only in OAM and the 5G NFs, and the NWDAF analytics cannot be used in terminals and access networks.

SUMMARY

Embodiments provide a network function.

Embodiments provide a method for providing analytics to UE by an AF.

Embodiments provide an AF that provides analytics to UE.

Embodiments provide UE requesting analytics.

According to an embodiment, a network function is provided. In such an embodiment, the network function includes: a processor, memory, and a communication device, wherein the processor executes a program stored in the memory to perform: receiving a UE identification (ID) of user equipment (UE) and analytics ID requested by the UE; and transmitting analytics corresponding to the analytics ID to the UE.

In an embodiment, when performing the transmitting the analytics corresponding to the analytics ID to the UE, the processor may perform: determining a network data analytics function (NWDAF) instance of an NWDAF capable of generating the analytics corresponding to the analytics ID; and transmitting the analytics generated by the NWDAF instance to the UE.

In an embodiment, when performing the transmitting the analytics generated by the NWDAF instance to the UE, the processor may perform transmitting the analytics to an application function (AF) that transfers the analytics to the UE through signaling of an application layer.

In an embodiment, when performing the transmitting the analytics to an AF that transfers the analytics to the UE through signaling of an application layer, the processor may perform transmitting the analytics to the AF via a network exposure function (NEF).

In an embodiment, when performing the receiving a UE ID of UE and analytics ID requested by the UE, the processor may perform receiving the UE ID and the analytics ID from an application function (AF) that transfers the analytics to the UE through signaling of an application layer.

In an embodiment, when performing the receiving the UE ID and the analytics ID from an AF that transfers the analytics to the UE through signaling of the application layer, the processor may perform receiving the UE ID and the analytics ID from the AF via a network exposure function (NEF).

In an embodiment, the signaling of the application layer may be hypertext transfer protocol (HTTP) signaling.

According to another embodiment, a method for providing analytics to user equipment (UE) by an application function (AF) is provided. In such an embodiment, the method includes: receiving a request for analytics from the UE through signaling of an application layer; receiving an identification (ID) of a network function that provides the analytics to the UE; and transferring the request for the analytics to the network function by using the ID of the network function.

In an embodiment, the request for the analytics may include an analytics ID for the analytics.

In an embodiment, the receiving an ID of a network function that provides the analytics to the UE may include: querying a network repository function (NRF) for a network function supporting the analytics ID; and receiving the ID of the network function from the NRF.

In an embodiment, the querying a network repository function (NRF) for a network function supporting the analytics ID may include providing the NRF with at least one of single-network slice selection assistance information (S-NSSAI), an analytics ID, and an application ID.

In an embodiment, the transferring the request for the analytics to the network function by using the ID of the network function may include performing a subscription for the analytics to the network function by using the UE ID of the UE and the analytics ID.

In an embodiment, the method may further include: retrieving the UE ID to a binding session function (BSF); and receiving the UE ID from the BSF.

In an embodiment, the retrieving the UE ID to a binding session function (BSF) may include transmitting at least one of an IP address of the UE, S-NSSAI, and a data network name (DNN) to the BSF.

In an embodiment, the method may further include: receiving the analytics from the network function; and delivering the analytics to the UE.

In an embodiment, the receiving the analytics from the network function may include receiving the analytics through a network exposure function (NEF) in the system when the AF is in a domain that cannot be trusted by the system to which the network function belongs.

According to yet another embodiment, an application function (AF) that provides analytics to user equipment (UE) is provided. In such an embodiment, the AF includes: a processor, memory, and a communication device, wherein the processor executes a program included in the memory to perform: receiving an analytics identification (ID) for a request of the analytics from the UE through signaling of an application layer; and transferring the request for the analytics to a network function that provides analytics corresponding to the analytics ID.

In an embodiment, the processor further performs: querying a network repository function (NRF) for the network function supporting the analytics ID; and receiving the ID of the network function from the NRF.

In an embodiment, when performing the querying a network repository function (NRF) for the network function supporting the analytics ID, the processor may perform providing the NRF with at least one of single-network slice selection assistance information (S-NSSAI), the analytics ID, and an application ID.

In an embodiment, when performing the transferring the request for the analytics to a network function that provides analytics corresponding to the analytics ID, the processor may perform performing subscription for the analytics to the network function by using the UE ID of the UE and the analytics ID.

According to yet another embodiment, user equipment (UE) requesting analytics is provided. The UE includes: a processor, memory, and a communication device, wherein the processor executes a program included in the memory to perform: requesting for the analytics to a core network by using signaling of an application layer via an application function (AF); and receiving, via the AF, the analytics from a network function in the core network selected by the AF, wherein the request for the analytics includes an analytics identification (ID) for the analytics.

In an embodiment, when performing the requesting for the analytics to a core network by using signaling of an application layer via an application function (AF), the processor may perform providing the AF with at least one of single-network slice selection assistance information (S-NSSAI) and an application ID.

In an embodiment, the analytics ID may be used to search the network function supporting the analytics ID.

In an embodiment, the AF may be a data collection AF (DCAF) or a data information AF (IEAF).

In an embodiment, the signaling of the application layer may be a hypertext transfer protocol (HTTP) signaling.

BRIEF DESCRIPTION OF THE DRAWINGS

FIG. 4 is a flowchart illustrating a method for requesting and transferring of analytics through an unreliable AF according to an embodiment.

FIG. 5 is a flowchart illustrating a method for requesting and delivering of analytics through an AF according to another embodiment.

DETAILED DESCRIPTION OF THE EMBODIMENTS

Figure 1A:
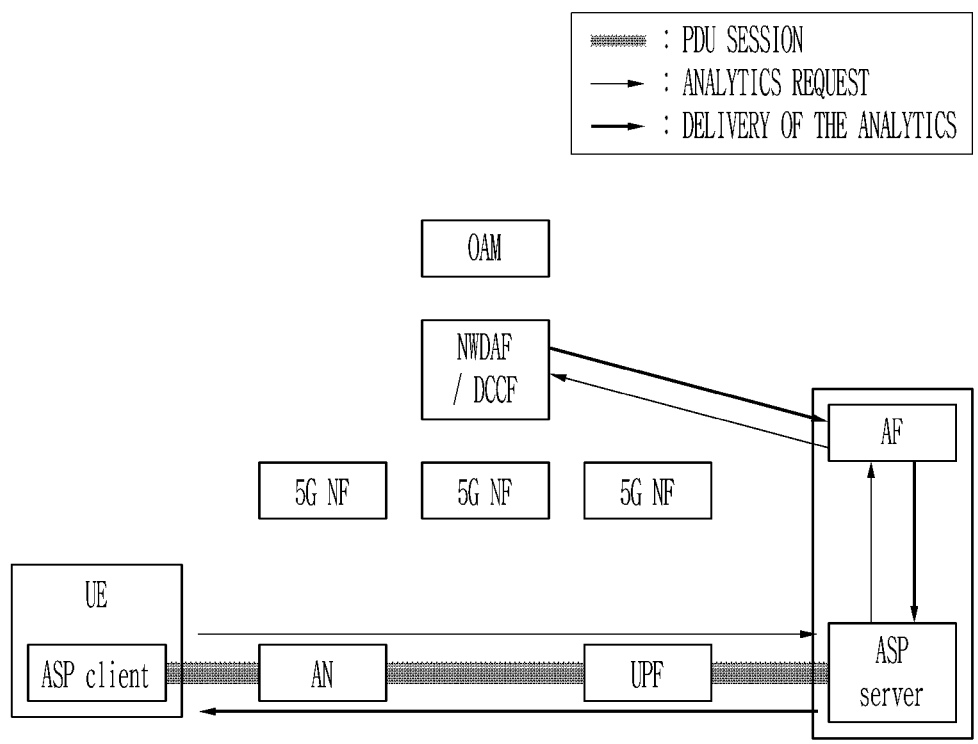
FIG. 1A and FIG. 1B is a schematic diagram illustrating a method for request and delivery of analytics through reliable AF according to an embodiment.

In the following detailed description, only certain embodiments of the present invention have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

Throughout the specification, user equipment (UE) may be called a terminal, a mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

As used herein, "A or B", "at least one of A and B", "at least one of A or B", "A, B, or C", "at least one of A, B, and C", and "at least one of A, B, or C" each may include any one of, or all possible combinations of, items listed together in the corresponding one of the phrases.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

This disclosure may provide a solution that enables user equipment (UE) to use analytics generated by a network data analytics function (NWDAF) when performing various decision-making processes.

Figure 1B:
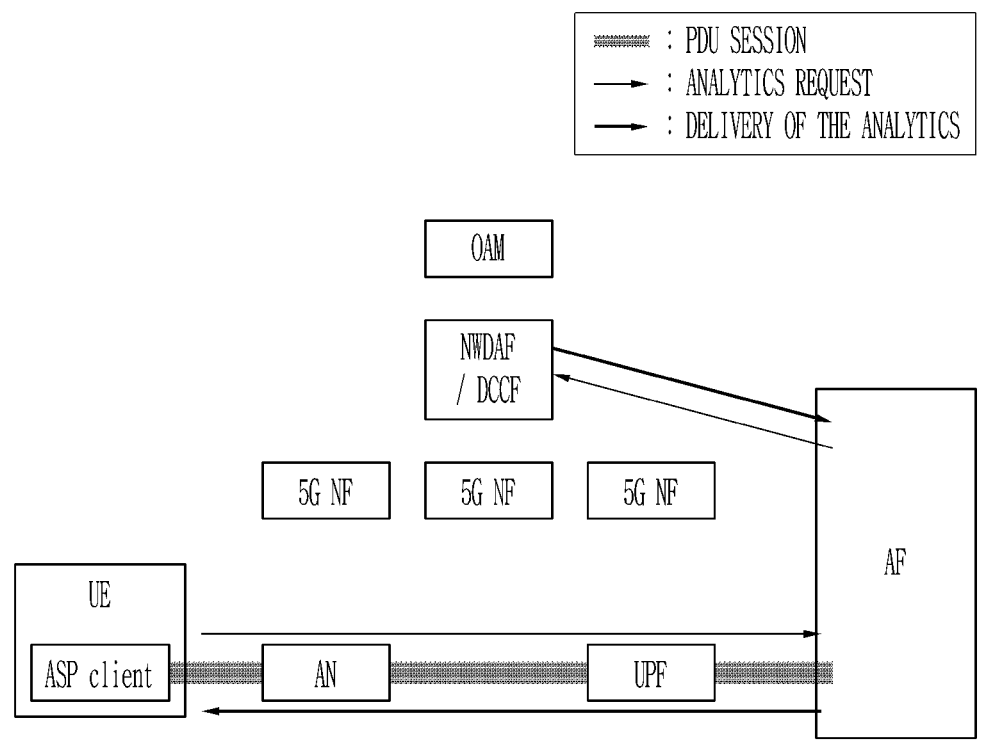
Figure 2:
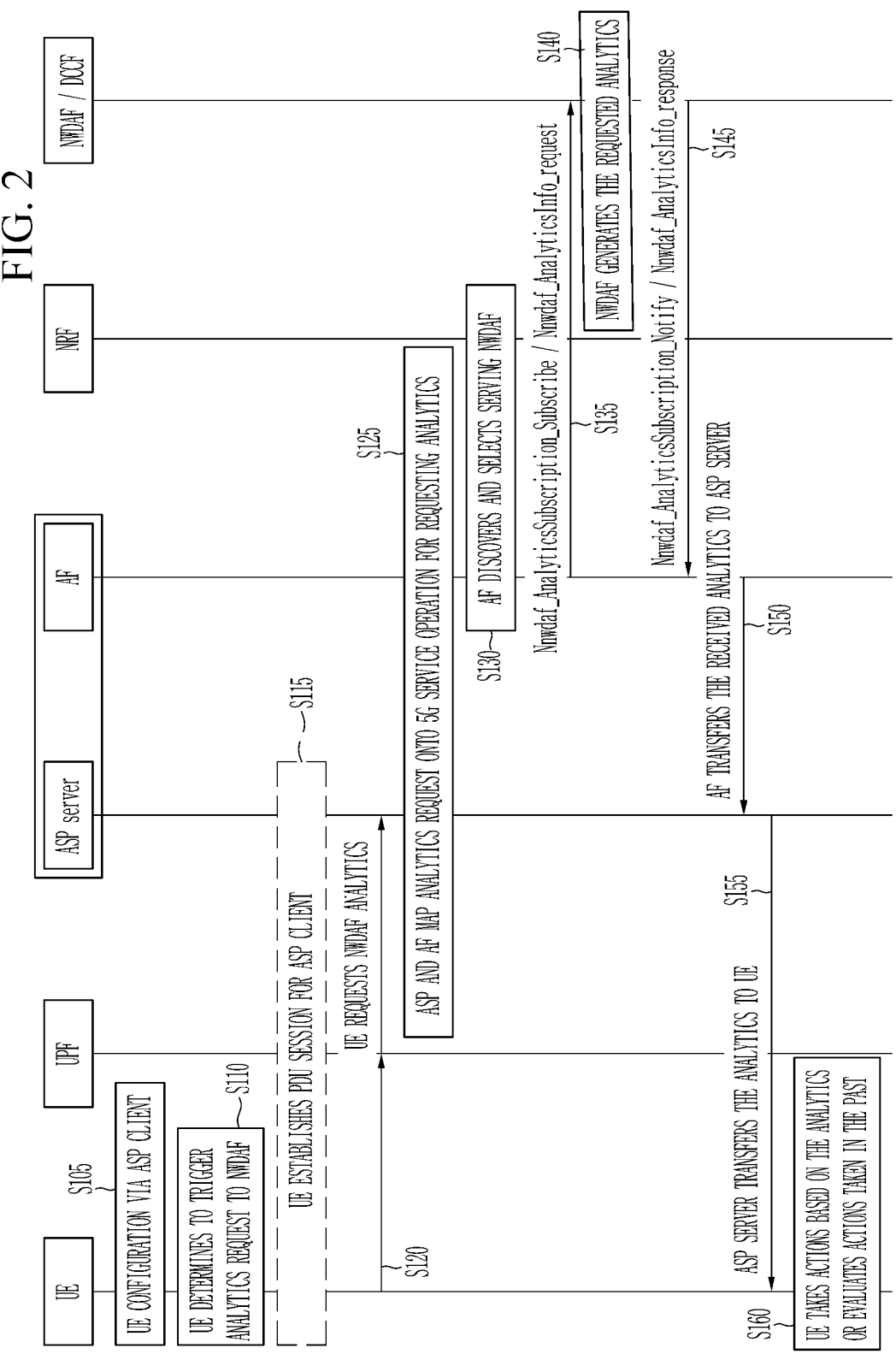
FIG. 2 is a flowchart illustrating a method for request and delivery of analytics through reliable AF according to an embodiment.

FIG. 1A and FIG. 1B is a schematic diagram illustrating a method for request and delivery of analytics through reliable AF according to an embodiment and FIG. 2 is a flowchart illustrating a method for request and delivery of analytics through reliable AF according to an embodiment.

Referring to FIG. 1A and FIG. 1B, flows of requesting analytics by the UE is shown as a thin solid line and flows of delivering analytics generated by NWDAF to the UE according to the request of the UE for the analytics is shown as a thick solid line.

In FIG. 1A and FIG. 1B, a plurality of paths may be used for request and delivery of the analytics. The plurality of paths may include a connection by a protocol data unit (PDU) session between an application service provider (ASP) server or AF and an ASP client in the UE or UE and a 5G service-based interface (SBI) connection (existing in a core network of the 5G system) between AF and NWDAF (or data collection coordination function (DCCF)). The plurality of paths may further include a connection between the ASP server and the AF in an ASP data center.

The ASP data center, which may include the ASP server and the AF, may be located within a mobile communication system or within a domain trusted by the mobile communication system.

In an embodiment, when the AF is in a trusted domain or is an entity trusted by the mobile communication system (i.e., trusted AF), the AF may be directly connected to the NWDAF or the DCCF in the core network.

The ASP client may be provided to the UE in advance by the mobile communication system so that the UE accesses the AF when requesting the analytics. For example, the UE may be a terminal dedicated to a specific operator to which the ASP client of the specific operator is installed in advance. Alternatively, the ASP client may be installed in the UE when the UE accesses the mobile communication system.

In an embodiment, a PDU session may be established between the UE and the ASP server or between the UE and the AF via an access network (AN) and a user plane function (UPF). The AF of the ASP data center may include the ASP server or the AF and the ASP server may be the same entity.

Referring to FIG. 2, the ASP may configure an address of the ASP server or AF and a service protocol with the ASP server or the AF in the UE by using the ASP client of the UE (S105). In addition, the ASP may configure a trigger condition for the analytics request in the UE.

The address of the ASP server or the AF may be expressed in the form of Internet protocol 5-tuple (IP 5-tuple), fully qualified domain name (FQDN), or a uniform resource locator (URL) and may be used by the UE when requesting and delivering the NWDAF analytics.

Through the service protocol, an identification of the analytics (Analytics ID), an identifier of a request type (e.g., subscription or one-time request), an identifier of a target for the analytics, and an indicator of the analytics report (e.g., period, maximum number of notifications, expiration time), etc. may be delivered.

When the ASP client is running in the UE, the UE may determine to trigger a request for the analytics (S110). If the trigger condition is configured in the ASP client, the UE may consider the condition to trigger the analytics request. For example, the UE may determine the trigger of the analytics request when at least one of the trigger conditions is satisfied.

When the PDU session for the ASP client does not exist, the UE may establish a PDU session for the ASP client to request the analytics from NWDAF (S115).

After the UE determines to trigger the analytics request for 5G NWDAF, the UE may transmit the analytics request to the address of the ASP server according to the service protocol configured through the ASP client (S120). When the AF performs functions as the ASP server, the UE may send the request for the analytics to the AF or to the AF address according to the service protocol. If the analytics request is not triggered, the UE may repeatedly re-execute step (S120).

In an embodiment, the request for the analytics may include an analytics ID.

The ASP server and AF may map the analytics request received from the UE to at least one service operation according to the configured service protocol (S125). At least one service operation to which the analytics request is mapped may include at least one of Nnwdaf_AnalyticsSubscritpion_Subscribe, Nnwdaf_AnalyticsInfo_request, and Ndccf_DataManagement_Subscribe.

In an embodiment, in order to map the analytics request of the UE to the 5G service operation, the AF may request predetermined information to the NF within the mobile network (AMF, UDR, PCF, etc.). Here, the predetermined information may include at least one of a session management function (SMF) ID, UE subscription permanent identifier (SUPI), single-network slice selection assistance information (S-NSSAI), an application identification (application ID), a slice ID determined for the UE.

In an embodiment, the AF may query a unified data management (UDM) for an appropriate SMF by using the IP address of the UE stored in the ASP server and the AF may receive the SMF ID of the SMF supporting the IP address of the UE from the UDM. Thereafter, the AF may query the SMF having the received SMF ID for the UE of the corresponding IP address and the SMF may deliver UE-related information (e.g., SUPI) mapped to the corresponding IP address to the AF. Thereafter, the AF may deliver the analytics request received from the corresponding UE to the DCCF or NWDAF along with the UE-related information.

The reliable AF may search for an NWDAF capable of providing the analytics requested from the UE through a network repository function (NRF) and select the NWDAF from the list of candidate NWDAFs provided from the NRF (S130). In an embodiment, the NRF may provide the AF with profiles of at least one NWDAF and/or candidate NWDAF list based on the analytics ID in the analytics request. The AF may select the NWDAF capable of providing the analytics requested by the UE.

In an embodiment, the AF may search for a DCCF and select the DCCF from the list of candidate DCCFs provided by the NRF. For example, the AF may deliver the analytics ID to the NRF and NRF may deliver information of at least one DCCF connected to the NWDAF that can provide the analytics requested by the UE based on the analytics ID of the UE to the AF.

The reliable AF may execute a service operation to which the analytics request from the UE is mapped for the selected NWDAF (S135). For example, the AF may transmit an Nnwdaf_AnalyticsSubscritpion_Subscribe or Nnwdaf_AnalyticsInfo_request to the selected NWDAF so that the NWDAF provides the analytics requested by the UE.

In an embodiment, the AF may request analytics from the DCCF by using a service operation (e.g., Ndccf_DataManagement_Subscribe) for the DCCF. The DCCF may transmit Nnwdaf_AnalyticsSubscription_Subscribe or Nnwdaf_AnalyticsInfo_request to the NWDAF after receiving Ndccf_DataManagement_Subscribe from the AF.

Afterwards, the NWDAF may generate the requested analytics (S140).

The NWDAF may transmit a service operation for transmitting the analytics generated according to the received service operation to the AF (S145). The service operation for transmitting the generated analytics may be Nnwdaf_AnalyticsSubscription_Notify or Nnwdaf_AnalyticsInfo_response.

In an embodiment, when AF selects the DCCF instead of a specific NWDAF, the NWDAF may send Nnwdaf_AnalyticsSubscription_Notify or Nnwdaf_AnalyticsInfo_response to the DCCF and the DCCF may deliver the analytics through a requested service operation (e.g., Ndccf_DataManagement_Notify, etc.).

The AF may transfer the analytics received from the NWDAF or the DCCF to the ASP server (S150) and the ASP server may deliver the requested analytics to the UE through the PDU session (S155).

The UE may receive the analytics, take an action based on the received analytics, and/or evaluate the action taken in past (S160).

Figure 3A:
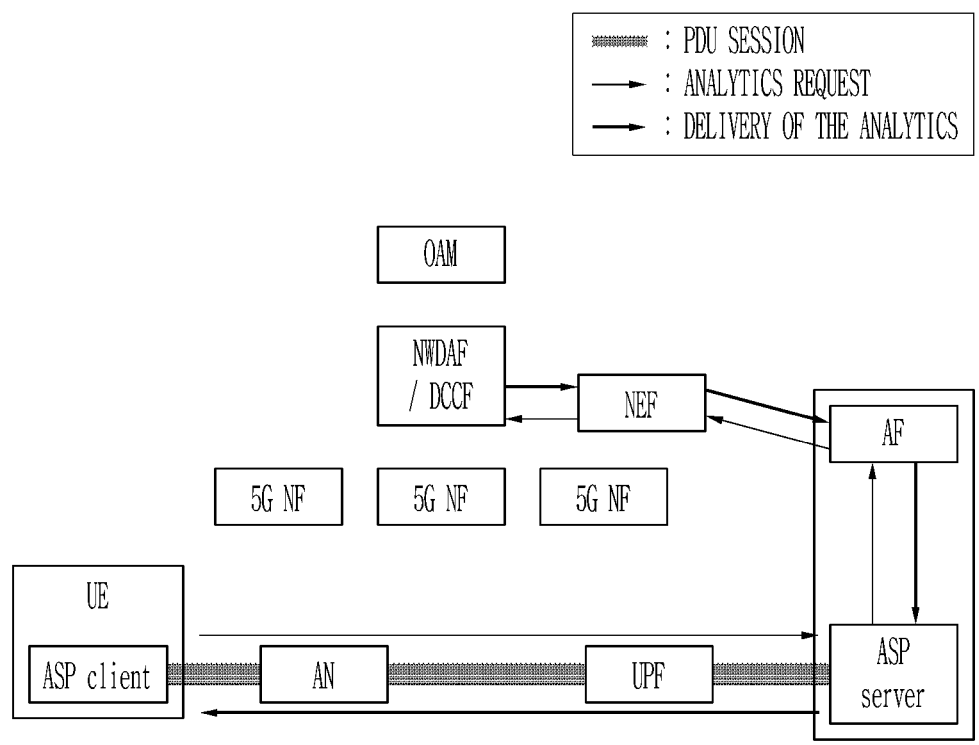
FIG. 3A and FIG. 3B is a schematic diagram illustrating a method for requesting and transferring of analytics through an unreliable AF according to an embodiment.
Figure 3B:
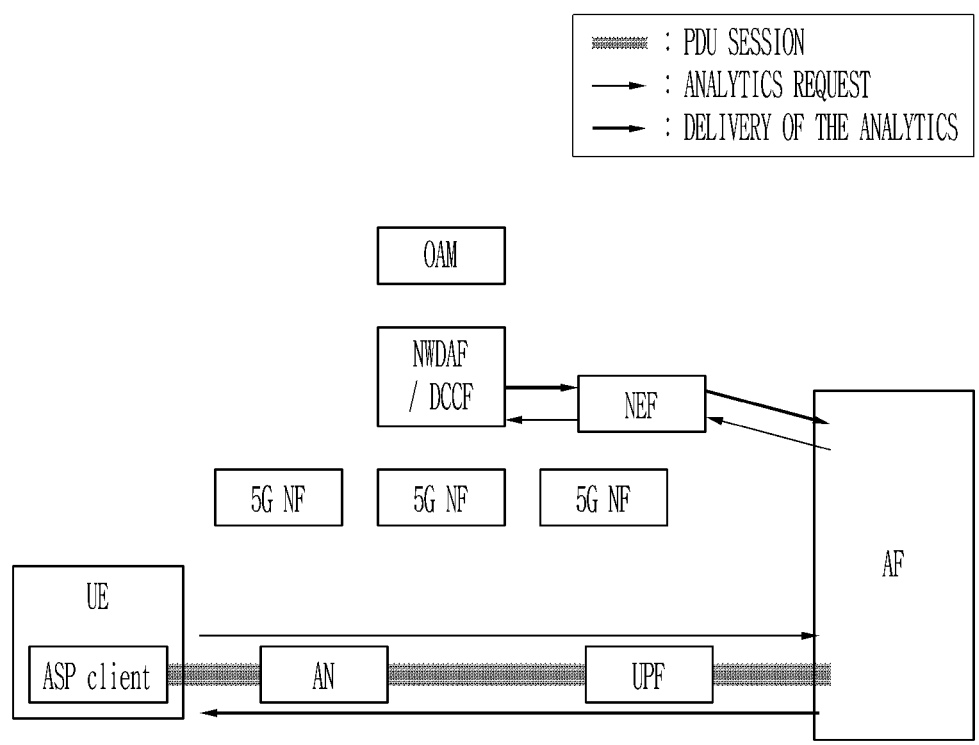

FIG. 3A and FIG. 3B is a schematic diagram illustrating a method for requesting and transferring of analytics through an unreliable AF according to an embodiment and FIG. 4 is a flowchart illustrating a method for requesting and transferring of analytics through an unreliable AF according to an embodiment.

Referring to FIG. 3A and FIG. 3B, flows in which the UE requests the analytics is shown as a thin solid line and flows in which analytics generated by the NWDAF is delivered to the UE according to the request of the UE for the analytics is shown as a thick solid line.

In FIG. 3A and FIG. 3B, a plurality of paths may be used for requesting and delivering the analytics. The plurality of paths may include a connection by a PDU session between the ASP server or the AF and the UE or the ASP client in the UE and a connection between the AF and the NEF. The NEF and the NWDAF (or DCCF) may exist within the 5G core network. The plurality of paths may further include a connection between the ASP server and the AF in the ASP data center.

In an embodiment, the PDU session may be established between the UE and the ASP server or the UE and the AF via the AN and the UPF. The AF in the ASP data center may include the ASP server or the AF and the ASP server may be the same entity.

In an embodiment, since the AF is in an untrusted domain (i.e., untrusted AF), the AF may be connected to the NWDAF or the DCCF via the NEF in the core network.

Referring to FIG. 4. the ASP providing service to the UE may configure the address of the ASP server or the AF and the service protocol with the ASP server or the AF in the UE by using the ASP client of the UE (S205). In addition, the ASP may configure a trigger condition for the analytics request to the UE. The address of the ASP server or the AF may be expressed in the form of IP 5-tuple, FQDN, or URL, and may be used by the UE to request and deliver the NWDAF analytics.

The service protocol may be used to carry an identification of the analytics (Analytics ID), an identifier of the request type (e.g., subscription or one-time request), an identifier of a target for the analytics, and an indicator of the analysis report (e.g., period, the maximum number of notifications, expiration time), etc.

When the ASP client is running in the UE, the UE may determine to trigger an analytics request (S210). If the trigger condition is configured in the ASP client, the UE may consider the condition to trigger the analytics request. For example, the UE may determine the trigger of the analytics request when at least one of the trigger conditions is satisfied.

When the PDU session for the ASP client does not exist, the UE may establish a PDU session for the ASP client to request the analytics from the NWDAF (S215).

After the UE determines to trigger the analytics request for 5G NWDAF, the UE may transmit the analytics request to an address of the ASP server according to the configured service protocol through the ASP client (S220). When the AF performs functions as the ASP server, the UE may send the analytics request to the AF (or the address of the AF) according to the service protocol. If the analytics request is not triggered, the UE may repeatedly re-execute step S220.

In an embodiment, the analytics request may include an analytics ID.

The ASP server and the AF may map the analytics request received from the UE to at least one service operation according to the configured service protocol (S225). At least one service operation to which the analytics request is mapped may include at least one of Nnef_AnalyticsExposure_Subscribe and Nnef_DataManagement_Subscribe.

In an embodiment, in order to map the analytics request of the UE to the 5G service operation, the AF may request predetermined information to the NF within the mobile network (AMF, UDR, PCF, etc.). Here, the predetermined information may include at least one of a UE generic public subscription identifier (GPSI) and an external identifier for a UE slice.

The unreliable AF may deliver the analytics request of the UE to the NEF (S230). The unreliable AF may use Nnef_AnalyticsExposure_Subscribe or Nnef_DataManagement_Subscribe as a service operation to deliver the analytics request to the NEF.

The NEF may search for NWDAFs capable of providing the analytics requested from the UE through the NRF and may select an NWDAF from the candidate NWDAF list or candidate DCCF list provided by the NRF (S235). In an embodiment, the NRF may provide the NEF with at least one profile of the NWDAF and/or candidate NWDAF list (or DCCF profile and/or candidate DCCF list) based on the analytics ID in the analytics request. NEF may select the NWDAF or the DCCF that can provide the analytics requested by the UE.

Alternatively, when Nnef_DataManagement_Subscribe is triggered, the NEF may deliver the candidate NWDAF list or candidate DCCF list provided by the NRF to the AF and the AF may select the NWDAF capable of providing the analytics or the DCCF connected to the NWDAF from the candidate NWDAF list or candidate DCCF list provided by the NRF. For example, the AF may deliver the analytics ID to the NRF via the NEF and the NRF may transmit information about at least one DCCF connected to the NWDAF that can provide the requested analytics to the UE based on the analytics ID of the UE to the AF via the NEF.

The unreliable AF may execute a service operation to which the analytics request is mapped through the NEF (S240). For example, the AF may execute Nnwdaf_AnalyticsSubscritpion_Subscribe, Nnwdaf_AnalyticsInfo_request, or Ndccf_DataManagement_Subscribe service operations for the selected NWDAF or DCCF through the NEF.

In an embodiment, AF may request the analytics from the DCCF by using a service operation (e.g., Ndccf_DataManagement_Subscribe) for the DCCF. Alternatively, the NEF may execute the Ndccf_DataManagement_Subscribe service operation for the selected DCCF by mapping the Nnwdaf_AnalyticsSubscritpion_Subscribe and/or Nnwdaf_AnalyticsInfo_request request received from the AF to the Ndccf_DataManagement_Subscribe service operation. The DCCF may transmit Nnwdaf_AnalyticsSubscription_Subscribe or Nnwdaf_AnalyticsInfo_request to the NWDAF after receiving Ndccf_DataManagement_Subscribe from the AF.

In order for the NEF to map service operations, the NEF may request predetermined information from NFs in the core network (AMF, UDR, PCF, etc.). The predetermined information may include at least one of UE SUPI, UE slice, and tracking area (TA) list.

Afterwards, the NWDAF may generate the requested analytics (S245).

The NWDAF may execute a service operation for the NEF to transmit the analytics generated according to the received service operation (S250). A service operation for transmitting the analytics may be Nnwdaf_AnalyticsSubscription_Notify or Nnwdaf_AnalyticsInfo_response.

In an embodiment, when the AF selects a DCCF instead of a specific NWDAF through the NEF, the NWDAF may send Nnwdaf_AnalyticsSubscription_Notify or Nnwdaf_AnalyticsInfo_response to the DCCF, and the DCCF may deliver the analytics through a requested service operation (Ndccf_DataManagement_Notify, etc.).

The NEF may transmit Nnef_AnalyticsExposure_Notify and Nnef_DataManagement_Notify including the analytics to the AF (S255).

The AF may transfer the analytics received from the NWDAF or the DCCF via the NEF to the ASP server (S260) and the ASP server may deliver requested analytics to the UE through the PDU session (S265).

The UE may receive the analytics, take an action based on the received analytics, and/or evaluate the action taken in past (S270).

FIG. 5 is a flowchart illustrating a method for requesting and delivering of analytics through an AF according to another embodiment.

In another embodiment, the DCCF may be used to transfer the analytics request from the UE to the NWDAF and to deliver the analytics generated by the NWDAF to the UE.

Trusted AFs may directly communicate with AFs in the core network and untrusted AFs may communicate with NFs in the core network through the NEFs within the core network.

Referring to FIG. 5. the UE may transmit an analytics request to the AF through signaling of an application layer (e.g., HTTP signaling) (S305).

The UE may send an analytics request to the AF by using a predetermined PDU session for the AF.

In an embodiment, the AF may be an AF (e.g., data collection application function (DCAF) or data information AF (IEAF) for delivering the analytics to the terminal.

In an embodiment, the analytics request may include an analytics ID. Alternatively, the analytics ID may be included in a request message of an application layer transmitted by the UE to the AF. The UE may also provide at least one of a slice identifier (e.g., S-NSSAI) and an application identification (application ID) to the AF.

In an embodiment, the AF may retrieve the UE IP address from the source IP address of the received packet. Since the supported S-NSSAI and a data network name (DNN) pairs for the PDU session established for the UE-AF are configured in the AF, the AF may retrieve the S-NSSAI and DNN for the PDU session used by the UE that has sent the analysis request.

The AF may send Nnrf_NFDiscovery_request to the NRF to discover the DCCF that supports an analytics ID requested by the UE (S310). The AF may provide the NRF with at least one of the slice identifier (e.g., S-NSSAI), the analytics ID, and the application ID for NWDAF selection. The DCCF may be an NF connected to the NWDAF capable of providing analytics corresponding to the analytics ID requested by the UE.

The NRF may send Nnrf_NFDiscovery_response including the discovered DCCF ID to the AF (S315). The AF may perform UE ID retrieval after receiving the DCCF ID from the NRF (S320).

When performing the UE ID retrieval, the AF may transmit at least one of the IP address of the UE, the S-NSSAI, and the DNN to a binding session function (BSF). The UE ID may be retrieved through a search for session binding information of the UE. The AF may transmit the UE IP address, the S-NSSAI, and the DNN to the BSF through Nbsf_Management_Discovery request. Afterwards, the BSF may provide the SUPI of the UE to the AF. The BSF may provide SUPI to the AF through Nbsf_Management_Discovery response message.

When the AF is in an untrusted domain, since the S-NSSAI and DNN are configured in the NEF, the AF may perform the UE ID retrieval by transferring the UE IP address to the NEF. When the UE IP address is received from the AF, the NEF may receive the UE ID from the BSF through Nbsf_Management_Discovery request/response message and Nudm_SDM_Get request/response message.

The AF may request the analytics by subscribing to the DCCF using the UE ID and the analytics ID. When the AF is within the trusted domain, the AF may send an Ndccf_DataManagement_Subscribe service operation to the DCCF (S325-1).

When the AF is in the untrusted domain, the AF may execute Nnef_DataManagement_Subscribe or Nnef_AnalyticsExposure_Subscribe service operation for the NEF and the NEF may send Ndccf_DataManagement_Subscribe service operation to the DCCF ((S325-2). The AF may subscribe to the DCCF via the NEF through Nnef_AnalyticsExposure_Subscribe service operation. In this case, the Nnef_AnalyticsExposure_Subscribe service operation may be extended to include the Ndccf_DataManagement_Subscribe service operation.

Before subscribing to the DCCF, the AF in the untrusted domain may ask authorization information for the UE from the NEF to check whether the UE is allowed to obtain the analytics ID from the network. The NEF may determine the authorization information for the UE based on local policy and the UE subscription data from the UDM about whether the UE has subscribed to a service that obtains a specific analytics ID from the network. Thereafter, the NEF may send the authorization information to the AF.

When the DCCF does not have an analytics result available for the requested analytics ID, the DCCF may trigger an analytics procedure for the analytics ID. The DCCF may perform user consent check for the UDM to determine whether the analytics procedure is allowed or not (S330).

The DCCF and NWDAF may perform the analytics procedure for the requested analytics ID (S335). In an embodiment, the DCCF may determine an NWDAF instance based on the requested analytics ID and the determined NWDAF instance may generate the analytics result corresponding to the requested analytics ID.

The DCCF may send the analytics result corresponding to the analytics ID to the AF. When the AF is within the trusted domain, the DCCF may directly transmit the analytics result to the AF through the Ndccf_DataManagement_Notify service operation (S340-1). When the AF is in the untrusted domain, the DCCF may transmit the analytics result to the AF via the NEF using Ndccf_DataManagement_Notify and Nnef_AnalyticsExposure_Notify or Nnef_DataManagement_Notify ((S340-2).

The AF may send the analytics result to the application client in the UE through signaling of the application layer (S345).

When the Subscribe/Notify service operation is invoked, the DCCF may further notify the analytics to the UE (S350). The DCCF may notify the AF of the analytics result periodically or aperiodically (event-driven).

The DCCF may provide the additionally generated analytics result to the AF of the trusted domain by invoking the Ndccf_DataManagement_Notify service operation (S355-1). In addition, the DCCF may provide an additionally generated analytics result to the AF of the untrusted domain via the NEF by using Ndccf_DataManagement_Notify and Nnef_DataManagement_Notify or Nnef_AnalyticsExposure_Notify service operations (S355-2).

The AF may transmit (expose) the additionally generated analytics result to the application client in the UE through signaling of the application layer (S360).

As described above, the UE according to embodiments can make a decision based on analytics and prediction information on the 5G network state, and accordingly, service and network quality can be greatly improved.

Figure 6:
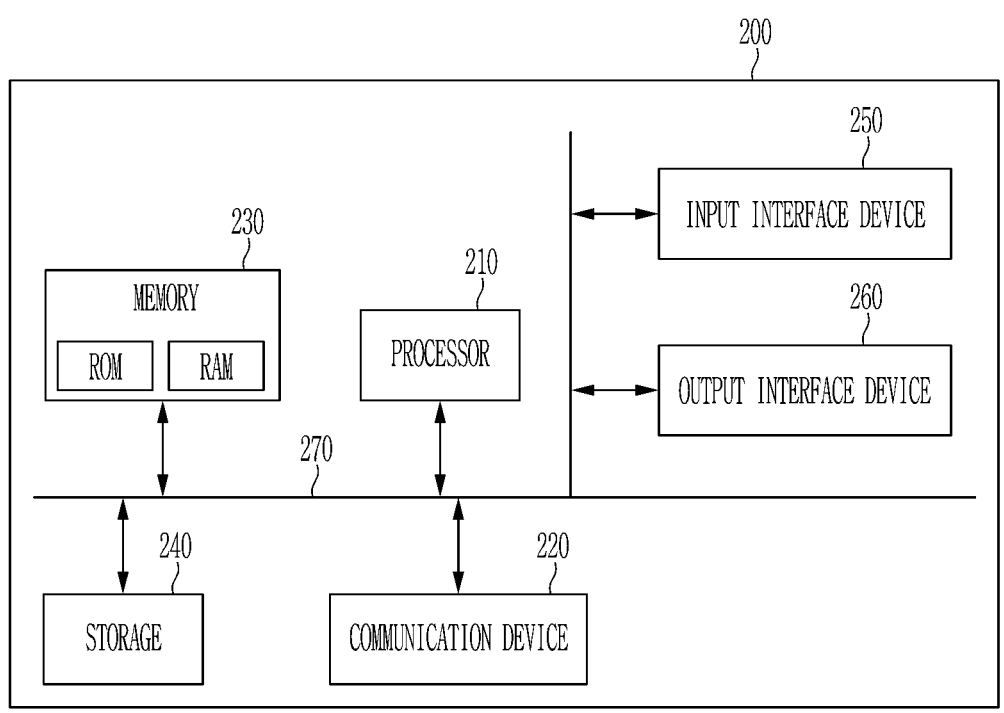
FIG. 6 is a block diagram illustrating a network function according to an embodiment.

FIG. 6 is a block diagram illustrating a network function according to an embodiment.

The network function according to embodiments may be implemented as a computer system, for example, a computer-readable medium. Referring to FIG. 2, the computer system 200 may include at least one of a processor 210, a memory 230, an input interface device 250, an output interface device 260, and a storage device 240 communicating through a bus 270. The computer system 200 may also include a communication device 220 coupled to the network. The processor 210 may be a central processing unit (CPU) or a semiconductor device that executes instructions stored in the memory 230 or the storage device 240. The memory 230 and the storage device 240 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 220 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages, and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above—described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A network function comprising:
a processor, memory, and a communication device, wherein the processor executes a program stored in the memory to perform:
receiving a request of analytics from user equipment (UE); and
transmitting analytics corresponding to an analytics identification (D) included in the request to the UE,
wherein while an application service provider (ASP) client is running in the UE, in response to satisfying a trigger condition configured by the ASP, the UE determines to trigger the request and sends the request to the network function through the ASP client.

2. The network function of claim 1, wherein:
when performing the transmitting the analytics corresponding to the analytics ID to the UE, the processor performs:
determining a network data analytics function (NWDAF) instance of an NWDAF capable of generating the analytics corresponding to the analytics ID; and
transmitting the analytics generated by the NWDAF instance to the UE.

3. The network function of claim 2, wherein:
when performing the transmitting the analytics generated by the NWDAF instance to the UE, the processor performs
transmitting the analytics to an application function (AF) that transfers the analytics to the UE through signaling of an application layer.

4. The network function of claim 3, wherein:
when performing the transmitting the analytics to an AF that transfers the analytics to the UE through signaling of an application layer, the processor performs transmitting the analytics to the AF via a network exposure function (NEF).

5. The network function of claim 3, wherein:
the signaling of the application layer is hypertext transfer protocol (HTTP) signaling.

6. The network function of claim 1, wherein:
when performing the receiving an analytics ID for a request of analytics from UE, the processor performs
receiving a UE ID of the UE and the analytics ID from an application function (AF) that transfers the analytics to the UE through signaling of an application layer.

7. The network function of claim 6, wherein:
when performing the receiving a UE ID of the UE and the analytics ID from an AF that transfers the analytics to the UE through signaling of the application layer, the processor performs
receiving the UE ID and the analytics ID from the AF via a network exposure function (NEF).

8. User equipment (UE) requesting analytics, comprising:
a processor, memory, and a communication device, wherein the processor executes a program included in the memory to perform:
determining to trigger a request of analytics to a mobile communication system in response to satisfying a trigger condition configured by the ASP, while an application service provider (ASP) client is running in the UE;
sending the request to the mobile communication system by using signaling of an application layer via an application function (AF); and
receiving, via the AF, the analytics from a network function that provides the analytics,
wherein the request for the analytics includes an analytics identification (ID) for the analytics.

9. The UE of claim 8, wherein:
when performing the requesting for the analytics to a mobile communication system by using signaling of an application layer via an application function (AF), the processor performs
providing the AF with at least one of single-network slice selection assistance information (S-NSSAI) and an application ID.

10. The UE of claim 8, wherein the analytics ID is used to search the network function supporting the analytics ID.

11. The UE of claim 8, wherein the AF is a data collection AF (DCAF) or a data information AF (IEAF).

12. The UE of claim 8, wherein the signaling of the application layer is a hypertext transfer protocol (HTTP) signaling.

* * * * *